United States Patent
Byrne et al.

(10) Patent No.: US 10,346,776 B2
(45) Date of Patent: Jul. 9, 2019

(54) PROJECT PLAN GENERATION FROM AN INFORMATION ARCHITECTURE MODEL

(71) Applicant: International Business Machines Corporation, Armonk, NY (US)

(72) Inventors: Brian P. Byrne, Austin, TX (US); Hayden Marchant, Ramat Bet Shemeseh (IL); Lior Zimmerman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 13/659,845

(22) Filed: Oct. 24, 2012

(65) Prior Publication Data

US 2014/0114863 A1    Apr. 24, 2014

(51) Int. Cl.
G06F 9/44    (2018.01)
G06Q 10/06    (2012.01)

(52) U.S. Cl.
CPC .............. G06Q 10/06316 (2013.01)

(58) Field of Classification Search
CPC ........................................ G06Q 10/06
USPC ........................................ 717/101
See application file for complete search history.

(56) References Cited

U.S. PATENT DOCUMENTS

| | | | | |
|---|---|---|---|---|
| 2006/0074736 A1* | 4/2006 | Shukla | ............... | G06Q 10/06 717/100 |
| 2008/0301698 A1* | 12/2008 | Badaloo | ............... | G06Q 10/06 718/107 |
| 2008/0313596 A1* | 12/2008 | Kreamer | ............... | G06F 8/20 717/101 |
| 2009/0112873 A1* | 4/2009 | Nanjangud Bhaskar | | G06F 8/10 |
| 2010/0313179 A1 | 12/2010 | Groves et al. | | |
| 2011/0004862 A1* | 1/2011 | Kejriwal | ............... | G06F 8/10 717/104 |
| 2011/0320985 A1 | 12/2011 | Byrne et al. | | |
| 2012/0197654 A1 | 8/2012 | Byrne et al. | | |
| 2013/0246112 A1* | 9/2013 | Comstock | ............. | G06Q 10/06315 705/7.15 |

OTHER PUBLICATIONS

U.S. Patent Application, dated Mar. 12, 2014, for U.S. Appl. No. 14/207,293, filed Mar. 12, 2014 entitled, "Project Plan Generation From an Information Architecture Model", invented by B.P. Byrne et al., pp. 1-26.

Preliminary Remarks, dated Mar. 12, 2014, for U.S. Appl. No. 14/207,293, filed Mar. 12, 2014 entitled, "Project Plan Generation From an Information Architecture Model", invented by B.P. Byrne et al., pp. 1-2.

(Continued)

*Primary Examiner* — Jae U Jeon
*Assistant Examiner* — Lenin Paulino
(74) *Attorney, Agent, or Firm* — Janaki K. Davda; Konrad, Raynes, Davda and Victor LLP

(57) ABSTRACT

Provided are a computer implemented method, computer program product, and system for generating a project plan by creating an association between a development method in a hierarchy of development methods and an architectural element in a hierarchy of architectural elements in a computer-based model of a system, and providing a computer-based user interface configured to facilitate navigation between the development method and the associated architectural element.

6 Claims, 11 Drawing Sheets

(56) References Cited

OTHER PUBLICATIONS

IBM, "IBM Rational Method Composer V7.5.1 delivers IBM Rational Team Concert interoperability and simplified method authoring", IBM United States Software Announcement, 210-395, dated Nov. 30, 2010. Retrieved from the Internet at, Total 19 pp.
Microsoft, "Importing Project 2007 Tasks from Excel Using a Managed Code Add-In", MSDN Library, Project 2007, Technical Articles, Aug. 2007. Retrieved from the Internet at, Total 47 pp.
IBM, "Associating Method Elements with Blueprint Palette Elements", IBM InfoSphere Information, Server Information center, InfoSphere Blueprint Director, Designing and implementing information blueprints, Templates, methods, and best practices, Version 8.7.0, Release date: Oct. 1, 2011. Retrieved from the Internet at Total 1 p.
IBM, "Associating Method Elements with Blueprint Palette Elements", IBM InfoSphere Information, Server Information center, InfoSphere Blueprint Director, Designing and implementing information blueprints, Templates, methods, and best practices, Version 8.7.0, Release date: Oct. 1, 2011. Retrieved from the Internet at Total 2 pp.
IBM, "IBM Rational Publishing Engine: Features and Benefits", Software, Rational, Downloaded Oct. 24, 2012. Retrieved from the Internet at Total 2 pp.
Karlsen, E.W., "Generating Compliance Documentation using IBM Rational Publishing Engine: Part 1. Overview and Workflow", IBM—developerWorks, Nov. 29, 2011. Retrieved from the Internet at Total 9 pp.
Karlsen, E.W., "Generating Compliance Documentation using IBM Rational Publishing Engine: Part 1. Overview and Workflow", IBM—developerWorks, Nov. 29, 2011, Total 14 pp.
Office Action, dated Sep. 11, 2015, for U.S. Appl. No. 14/207,293 (54.98C1), filed Mar. 12, 2014, invented by B.P. Byrne et al., Total 15 pages.
Response to Office Action, dated Dec. 11, 2015, for U.S. Appl. No. 14/207,293 (54.98C1), filed Mar. 12, 2014, invented by B.P. Byrne et al., Total 8 pages.
Final Office Action, dated Mar. 9, 2016, for U.S. Appl. No. 14/207,293 (54.98C1), filed Mar. 12, 2014, invented by B.P. Byrne et al., Total 19 pages.
Response to Final Office Action, dated Jun. 7, 2016, for U.S. Appl. No. 14/207,293 (54.98C1), filed Mar. 12, 2014, invented by B.P. Byrne et al., Total 15 pages.
Office Action, dated Nov. 30, 2016, for U.S. Appl. No. 14/207,293 (54.98C1), filed Mar. 12, 2014, invented by B.P. Byrne et al., Total 23 pages.
Response to Office Action, dated Feb. 27, 2017, for U.S. Appl. No. 14/207,293 (54.98C1), filed Mar. 12, 2014, invented by B.P. Byrne et al., Total 18 pages.
Final Office Action, dated May 8, 2017, for U.S. Appl. No. 14/207,293 (54.98C1), filed Mar. 12, 2014, invented by B.P. Byrne et al., Total 27 pages.
Response to Final Office Action, dated Aug. 8, 2017, for U.S. Appl. No. 14/207,293 (54.98C1), filed Mar. 12, 2014, invented by B.P. Byrne et al., Total 21 pages.
Final Office Action, dated Apr. 19, 2018, for U.S. Appl. No. 14/207,293 (54.98C1), filed Mar. 12, 2014, invented by B.P. Byrne et al., Total 15 pages.
Response to Final Office Action, dated Jun. 22, 2018, for U.S. Appl. No. 14/207,293 (54.98C1), filed Mar. 12, 2014, invented by B.P. Byrne et al.,Total 15 pages.
Office Action, dated Aug. 6, 2018, for U.S. Appl. No. 14/207,293 (54.98C1), filed Mar. 12, 2014, invented by B.P. Byrne et al., Total 14 pages.
Office Action, dated Sep. 19, 2017, for U.S. Appl. No. 14/207,293 (54.98C1), filed Mar. 12, 2014, invented by B.P. Byrne et al., Total 15 pages.
Response to Office Action, dated Jan. 19, 2018, for U.S. Appl. No. 14/207,293 (54.98C1), filed Mar. 12, 2014, invented by B.P. Byrne et al., Total 13 pages.
Response to Office Action, dated Dec. 6, 2018, for U.S. Appl. No. 14/207,293 (54.98C1), filed Mar. 12, 2014, invented by B.P. Byrne et al., Total 16 pages.
Notice of Allowance, dated Jan. 29, 2019, for U.S. Appl. No. 14/207,293, filed May 12, 2014, invented by B.P. Byrne et al., Total 13 pages.

* cited by examiner

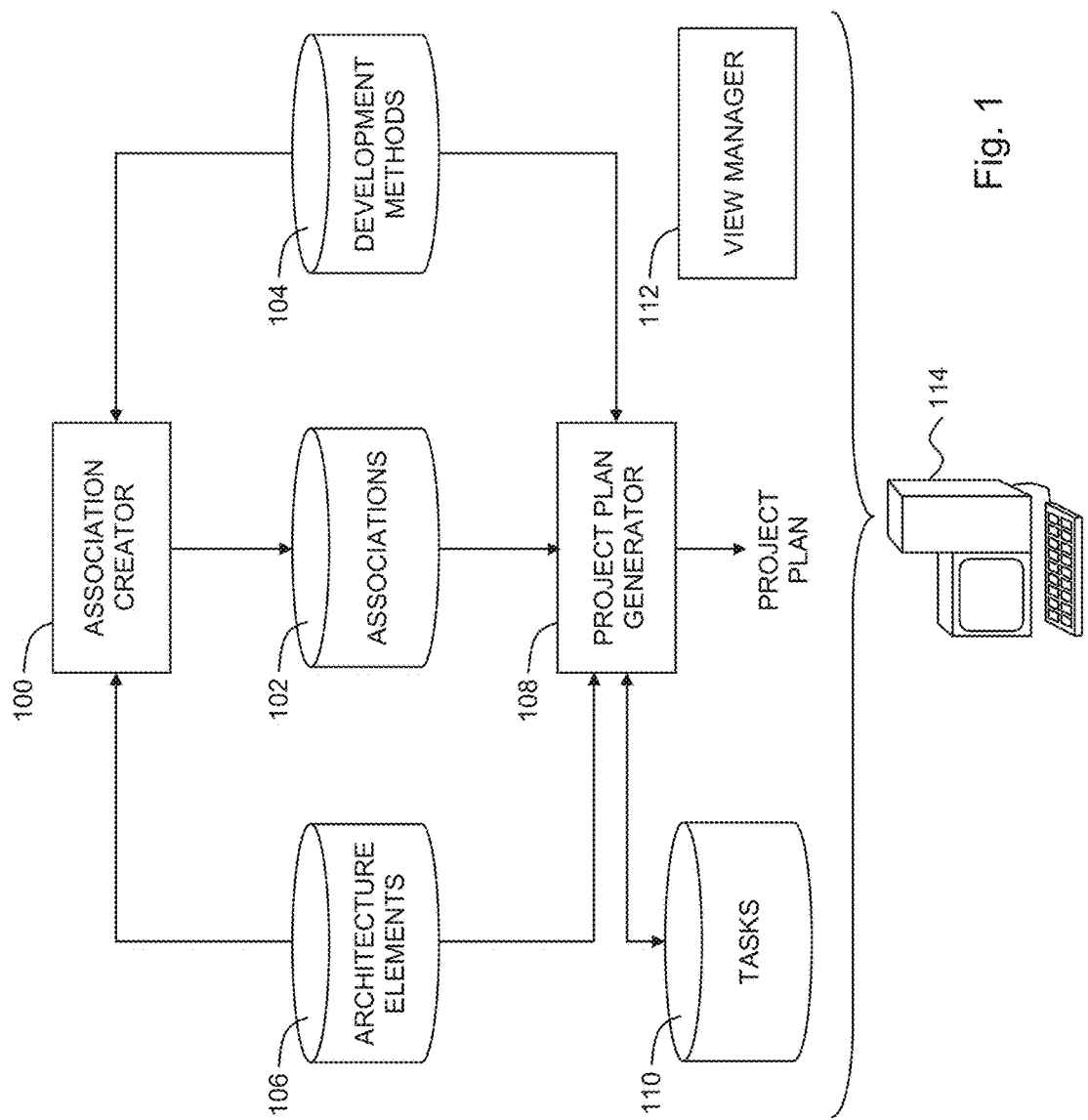

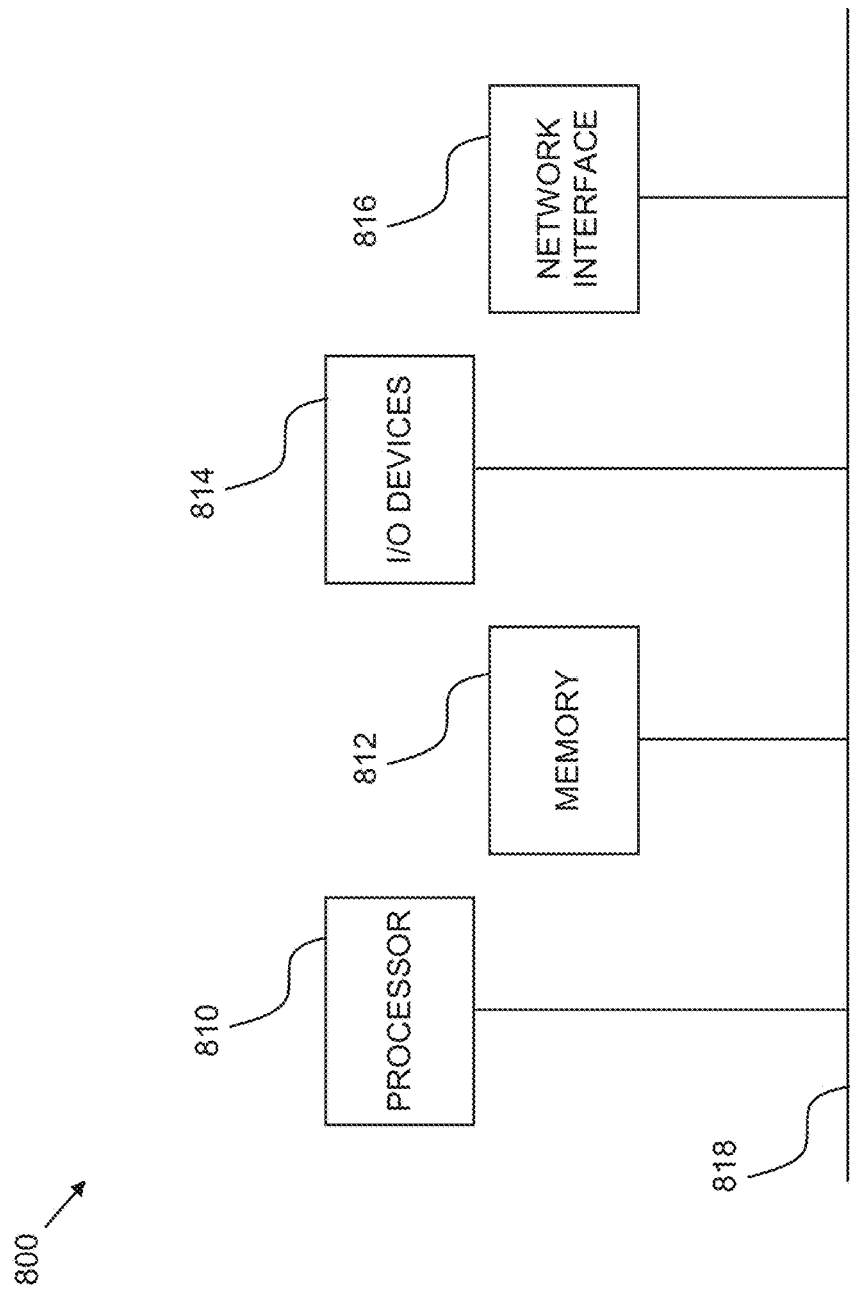

ns system. Accordingly, aspects of the

PROJECT PLAN GENERATION FROM AN INFORMATION ARCHITECTURE MODEL

FIELD

Embodiments of the invention relate to computer-based tools for information architecture modeling and project management.

BACKGROUND

When organizations embark on information integration projects, and particularly large projects involving multiple teams, one of the most fundamental documents that is usually composed is a "solution blueprint" in the form of a series of diagrams modeling the information architecture. This blueprint typically describes the information landscape of the project such that all the teams can understand both the information assets being integrated, as well as the role of each information asset within the project. Computer-based tools may be used to model an information architecture in a hierarchical manner, where an information asset in a higher-level diagram can be drilled down to expose a lower-level diagram describing that information asset in more detail.

In addition to the information architecture, information integration projects typically require the preparation of project plans and schedules indicating what and when development methods are to be performed. Unfortunately, organizations spend a great deal of time and resources managing project plans and schedules, often as a completely separate activity from managing the information architecture model and using separate computer-based tools. This often leads to a lot of manual work in crafting a project plan based on an information architecture, which is disconnected both from the information architecture and from task-related guidance, resulting in a gap between the final developed solution and the information architecture requirements.

SUMMARY

Provided are a computer implemented method, computer program product, and system for generating a project plan by creating an association between a development method in a hierarchy of development methods and an architectural element in a hierarchy of architectural elements in a computer-based model of a system, and providing a computer-based user interface configured to facilitate navigation between the development method and the architectural element.

In another aspect, provided are a computer implemented method, computer program product, and system for generating a task corresponding to the association between the development method and the architectural element, wherein the task is derived from the development method, and generating a project plan in which the task is presented in association with the architectural element.

BRIEF DESCRIPTION OF THE SEVERAL VIEWS OF THE DRAWINGS

In the drawings, like reference numbers represent corresponding parts throughout.

Embodiments of the invention will be understood and appreciated more fully from the following detailed description taken in conjunction with the appended drawings in which:

FIG. 1 is a simplified conceptual illustration of a system for project plan generation, constructed and operative in accordance with embodiments of the invention;

FIG. 8 is a simplified block diagram illustration of an exemplary hardware implementation of a computing system, constructed and operative in accordance with embodiments of the invention.

DETAILED DESCRIPTION

Figure 2A:
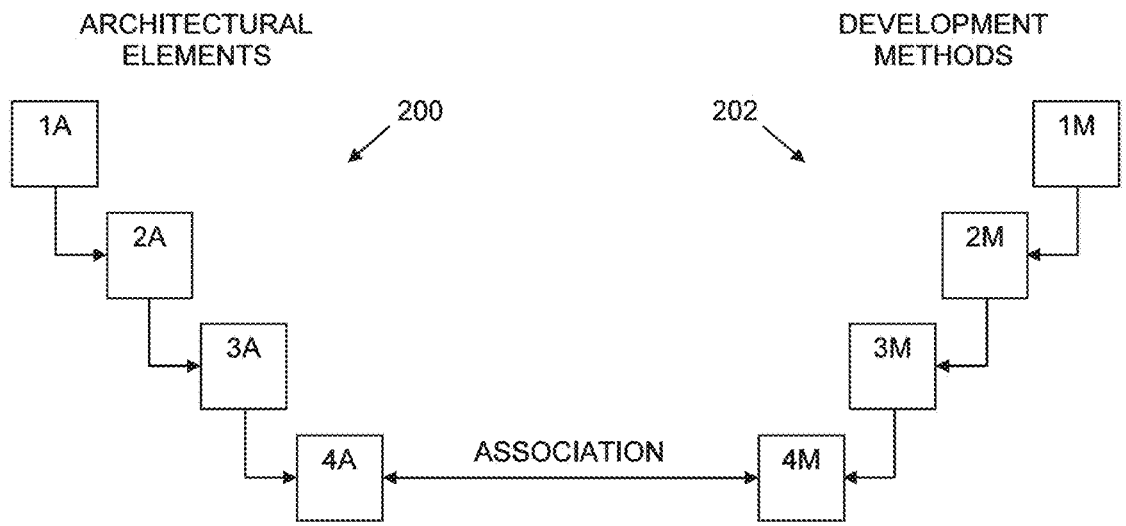
FIGS. 2A and 2B, taken together, is a simplified example illustrating aspects of the operation of the system of FIG. 1, operative in accordance with embodiments of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, any other storage device or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for project plan generation, constructed and operative in accordance with embodiments of the invention. In the system of FIG. 1, an association creator 100 is preferably configured to create associations 102 between development methods 104 in a hierarchy of development methods and architectural elements 106 in a hierarchy of architectural elements in a computer-based model of a system, such as, for example, where the architectural elements represent databases in a computer-based data processing system, Extract-Transform-and-Load (ETL) components of a data warehousing system, or federated queries. Architectural elements 106 may be defined using computer-based tools (such as IBM™ InfoSphere™ Blueprint Director, commercially available from International Business Machines Corporation, Armonk, N.Y.), and is preferably defined to include information regarding the hierarchical relationships between the architectural elements. (IBM and InfoSphere are trademarks of International Business Machines Corporation registered in many jurisdictions worldwide.) The term "development method" as used herein refers to a predefined procedure that may be employed when implementing an architectural element. For example, association creator 100 may create an association between a predefined "Design Warehouse Model" development method and a "Customer Warehouse" architectural element, indicating that in order to implement the Customer Warehouse, a warehouse model must be designed.

Associations 102 between development methods 104 and architectural elements 106 may be created by a human operator using association creator 100. Additionally or alternatively, associations 102 between development methods 104 and architectural elements 106 may be created using computer-based tools other than association creator 100, where associations 102 are made accessible to association creator 100.

A project plan generator 108 is preferably configured to generate a project plan by generating one or more tasks 110 corresponding to any, and preferably each, of the associations between development methods 104 and architectural elements 106. The term "task" as used herein refers to a definite piece of work that is derivable from a predefined definition of a development method, that is assignable to a person, one or more group of persons, or any other entity or entities capable of carrying out the task, and that may be employed when implementing an architectural element. For example, the predefined "Design Warehouse Model" development method may include instructions, guidance, and/or tips of how to carry out the development method, from which one or more tasks may be derived and generated corresponding to an association between the "Design Warehouse Model" development method and the "Customer Warehouse" architectural element. In this manner, a development method that is associated with an architectural element may be "instantiated" as one or more tasks associated with the architectural element in a project plan. Project plan generator 108 is preferably configured to list within the project plan any, and preferably every, generated task 110 in association with the architectural element 106 for whose association with a development method 104 the task was generated, as well as in association with one or more ancestors of the architectural element 106 in the hierarchy of architectural elements. Project plan generator 108 is preferably configured to list the associations between generated tasks 110 and architectural elements 106 in a hierarchy that generally corresponds to the hierarchy of development methods 104 from which the tasks were derived. Development methods 104 that are not themselves directly associated with architectural elements 106, but that are ancestors of development methods 104 that are, may nevertheless be included and listed by project plan generator 108 within the project plan hierarchy, appearing within the project plan as tasks themselves whether or not they are generated as actual tasks themselves. Project plan generator 108 is preferably configured to render the generated project plan into a project planning environment (such as IBM™ Rational Team Concert, commercially available from International Business Machines Corporation, Armonk, N.Y.).

Figure 2B:
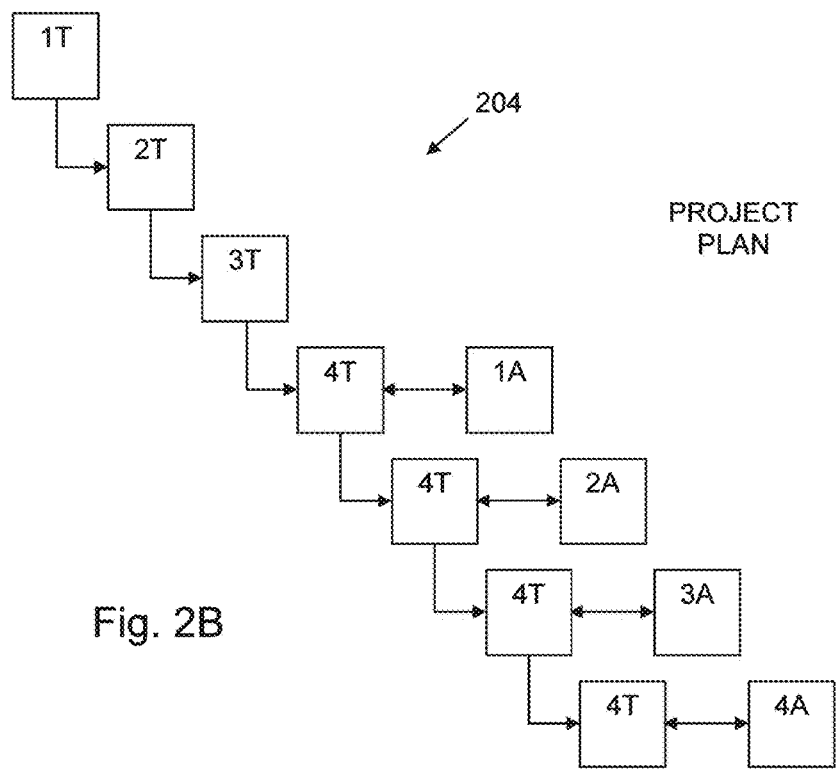

Additional reference is now made to FIG. 2, in which a hierarchy of architectural elements labeled 1A, 2A, 3A, and 4A, generally designated 200, and a hierarchy of development methods labeled 1M, 2M, 3M, and 4M, generally designated 202, are shown. In hierarchy 200, the architectural element labeled 4A has ancestor architectural elements labeled 1A, 2A, and 3A. Given an association between architectural element 4A and development method 4M, project plan generator 108 generates a project plan 204 where the association between architectural element 4A and development method 4M results in the generation of a task 4T that is derived from development method 4M and that is listed in association with architectural element 4A. The task 4T may also be listed within project plan 204 in association with any of the ancestors of architectural element 4A in hierarchy 200, such as being listed in association with architectural elements 1A, 2A, and/or 3A. The associations between generated tasks and architectural elements are listed in project plan 204 in a hierarchy that generally corresponds to hierarchy 202 of development methods from which the tasks were derived. Furthermore, the ancestors of development method 4M, labeled 1M, 2M, and 3M, that are not themselves directly associated with architectural elements may nevertheless be included and listed by project plan generator 108 within the hierarchy of project plan 204, appearing within project plan 204 as tasks 1T, 2T, and 3T, whether or not they are generated as actual tasks themselves.

Returning again to FIG. 1, a view manager 112 is preferably configured to provide a computer-based user interface for facilitating navigation between development methods 104 and their associated architectural elements 106, such as by establishing interoperational linkage between the architectural elements 106 that are maintained in a first computer-based tool (such as IBM™ InfoSphere™ Blueprint Director), and the generated tasks 110 of the generated project plan that is maintained, preferably together with status information of the tasks 110, in a second computer-based tool (such as IBM™ Rational Team Concert). View manager 112 preferably uses the interoperational linkage to facilitate the presentation of the generated tasks 110 and their status information by the first computer-based tool when it presents architectural elements 106, as well as to facilitate navigation from architectural elements 106 as presented within a user interface of the first computer-based tool to their related tasks 110 of the related project plan as presented within a user interface of the second computer-based tool.

Any of the elements shown in FIG. 1 are preferably implemented by, are embodied within, or are otherwise accessible to, a computer 114, such as by implementing any of the elements in computer hardware and/or in computer software embodied in a non-transitory, computer-readable medium in accordance with conventional techniques.

Figure 3:
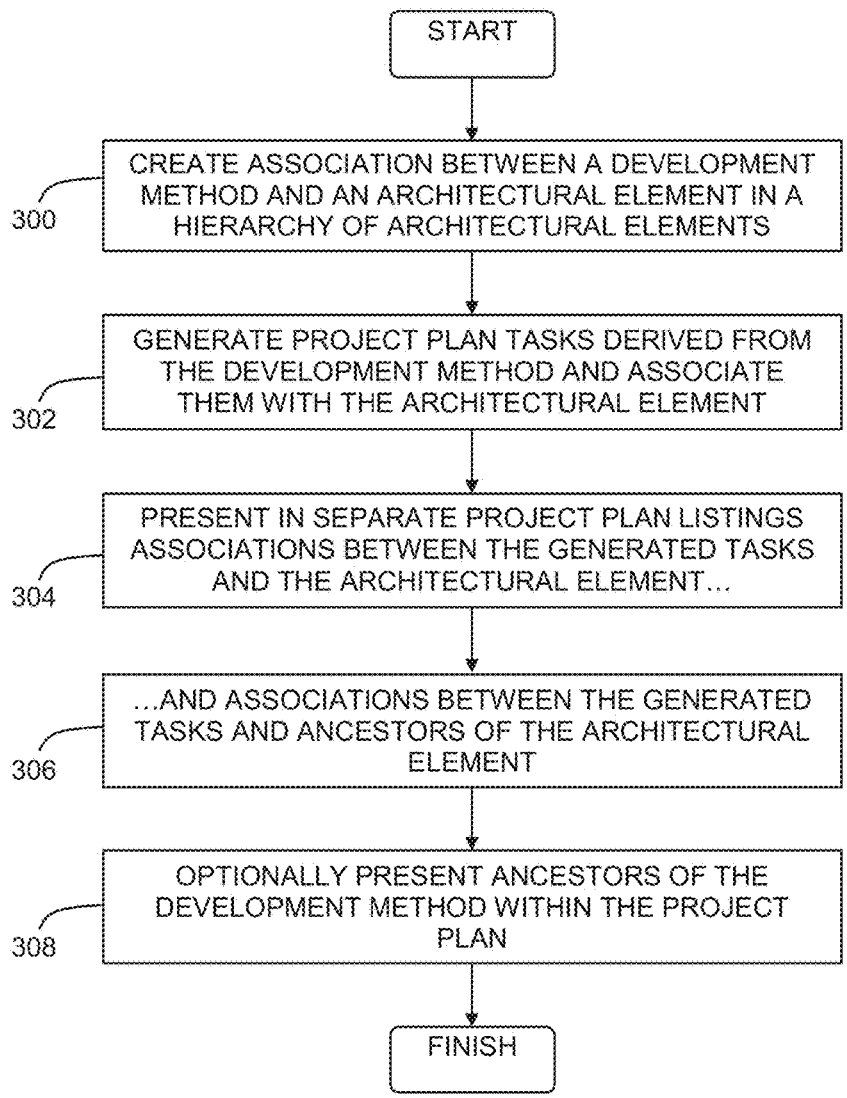
FIG. 3 is a simplified flowchart illustration of an exemplary method of operation of the system of FIG. 1, operative in accordance with embodiments of the invention.

Reference is now made to FIG. 3, which is a simplified flowchart illustration of an exemplary method of operation of the system of FIG. 1, operative in accordance with embodiments of the invention. In the method of FIG. 3, an association is created between a development method and an architectural element in a hierarchy of architectural elements in a model of a system (step 300). A project plan is generated by generating one or more tasks derived from the development method and associating the tasks with the architectural element (step 302). Each generated task is presented within the project plan together with its associated architectural element in a separate listing for each such association (step 304) and together with ancestors of its associated architectural element in a separate listing for each such association (step 306). Ancestors of the development method that are not themselves directly associated with architectural elements are optionally presented as separate listings within the project plan as ancestors of the task generated from its descendant (step 308).

Figure 4A:
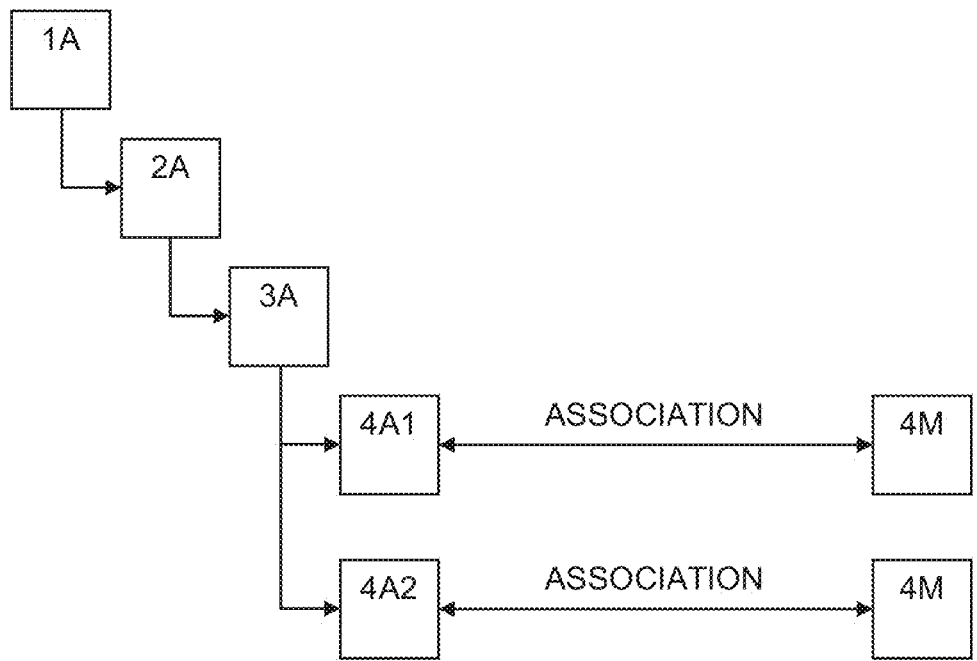
FIGS. 4A, 4B, and 4C, taken together, is a simplified example illustrating aspects of the operation of the system of FIG. 1, operative in accordance with embodiments of the invention.
Figure 4B:
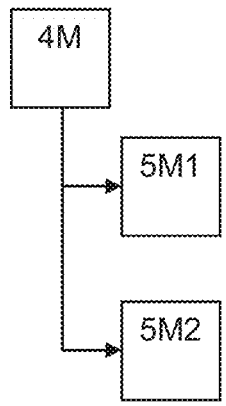
Figure 4C:
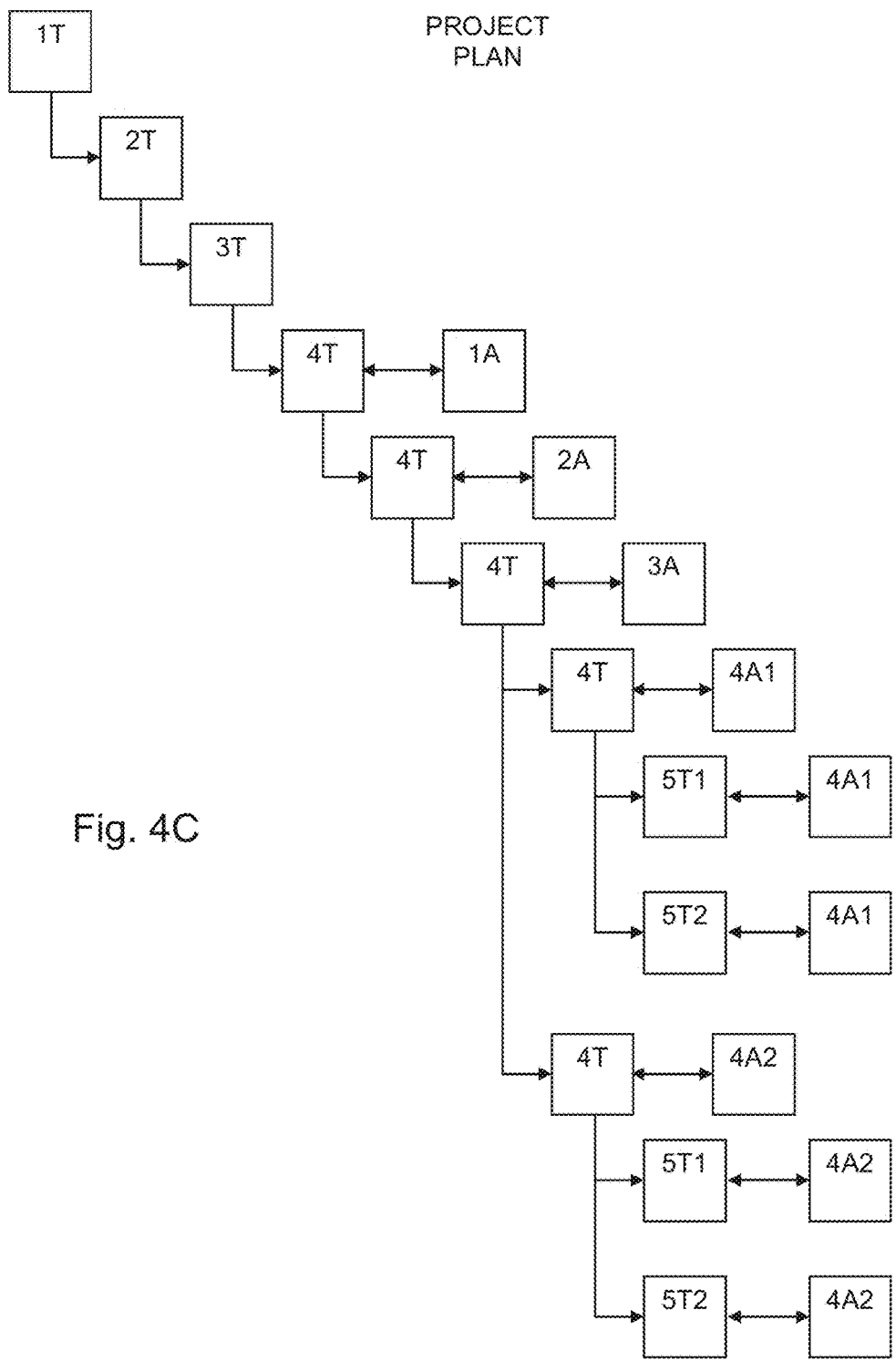

Reference is now made to FIGS. 4A, 4B, and 4C, which, taken together, is a simplified example illustrating aspects of the operation of the system of FIG. 1, operative in accordance with embodiments of the invention. The example shown in FIGS. 4A, 4B, and 4C, is substantially similar to the example shown in FIGS. 2A and 2B, but with the notable exception that in FIG. 4A two architectural elements labeled 4A1 and 4A2 that are siblings in the hierarchy of architectural elements are each associated with development method 4M, which itself has two descendant development methods labeled 5M1 and 5M2 as shown in FIG. 4B. In this scenario, in addition to generating task 4T and listing associations between task 4T and architectural elements 1A, 2A, 3A, 4A1, and 4A2 in a project plan, tasks 5T1 and 5T2 are generated and associated with architectural elements 4A1 and 4A2 and presented as shown in the project plan in FIG. 4C that is generated by project plan generator 108 (FIG. 1).

Figure 5:
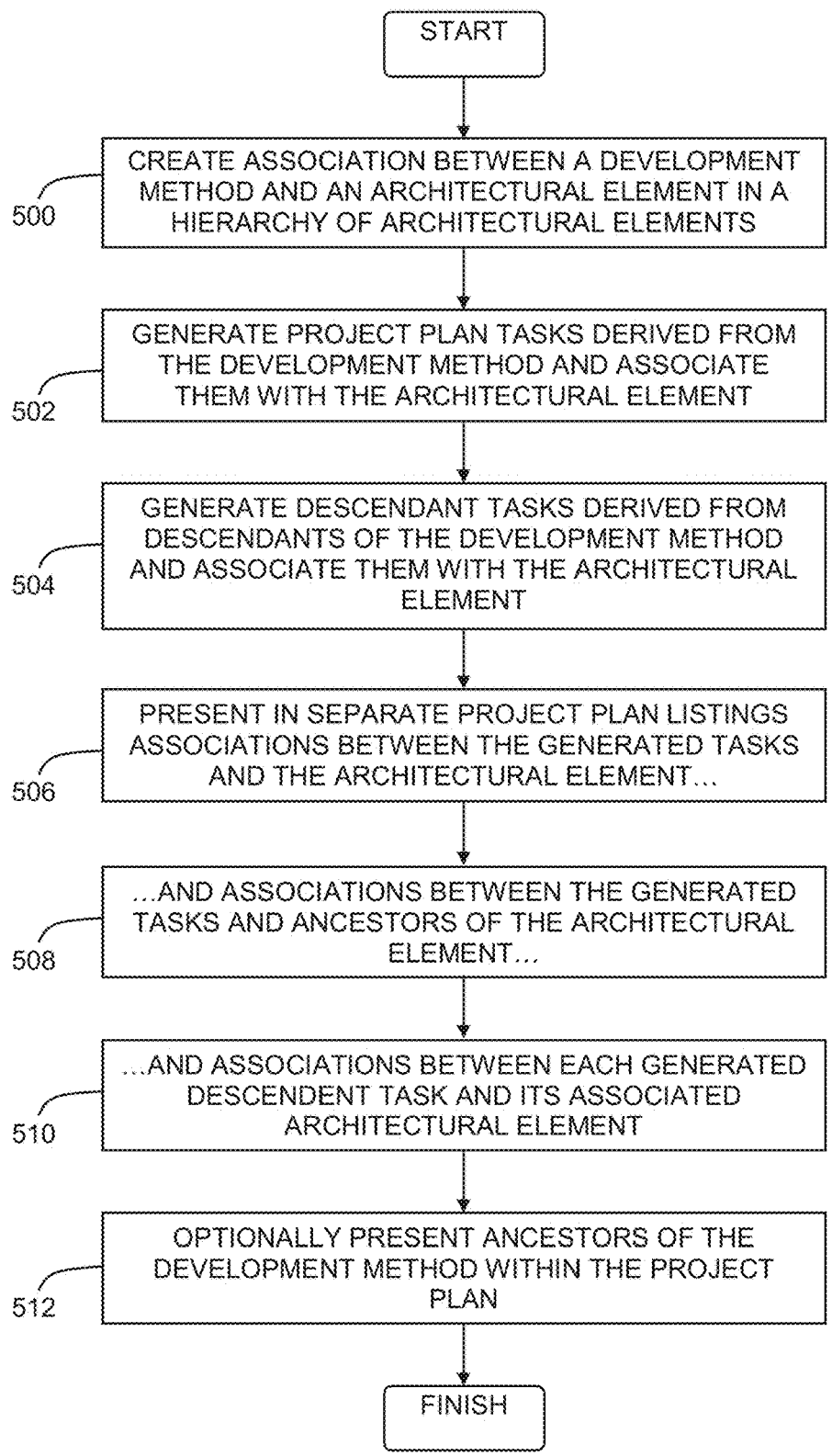
FIG. 5 is a simplified flowchart illustration of an exemplary method of operation of the system of FIG. 1, operative in accordance with embodiments of the invention.

Reference is now made to FIG. 5, which is a simplified flowchart illustration of an exemplary method of operation of the system of FIG. 1, operative in accordance with embodiments of the invention. In the method of FIG. 5, an association is created between a development method and an architectural element in a hierarchy of architectural elements in a model of a system (step 500). A project plan is generated by generating one or more tasks derived from the development method and associating the tasks with the architectural element (step 502), and by generating one or more descendant tasks derived from descendants of the development method and associating the descendant tasks with the architectural element (step 504). Each generated task derived from the development method is presented within the project plan together with its associated architectural element in a separate listing for each such association (step 506) and together with ancestors of its associated architectural element in a separate listing for each such association (step 508). Each generated descendant task is presented within the project plan together with its associated architectural element in a separate listing for each such association (step 510). Ancestors of the development method that are not themselves directly associated with architectural elements are optionally presented within the project plan as ancestors of the task generated from its descendant (step 512).

Figure 6A:
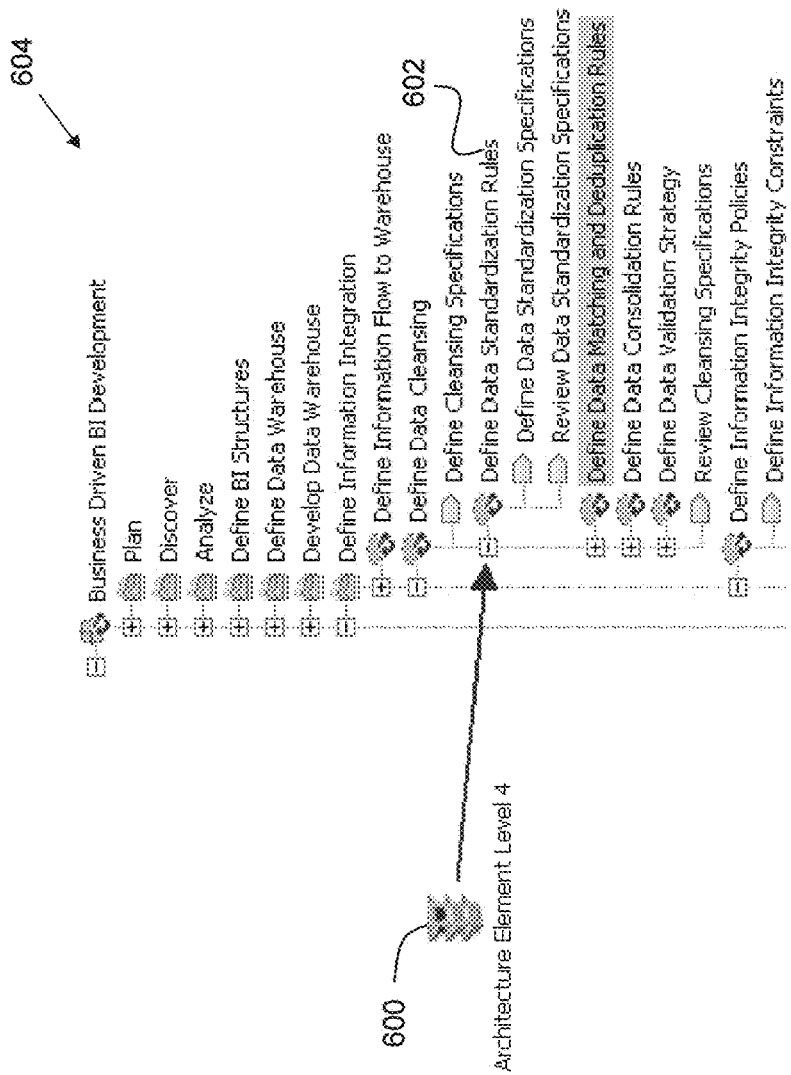
FIGS. 6A and 6B, taken together, is a simplified example illustrating aspects of the operation of the system of FIG. 1, operative in accordance with embodiments of the invention.
Figure 6B:
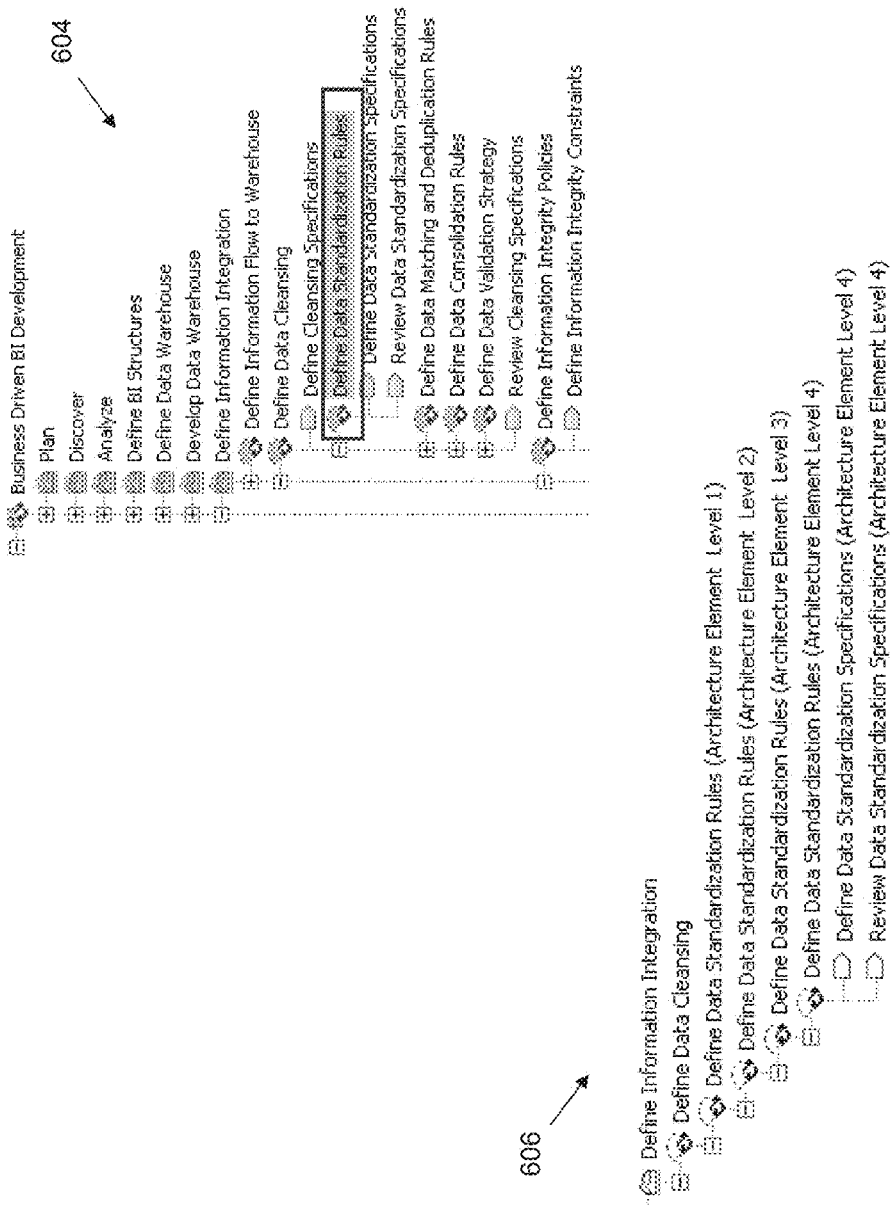

Reference is now made to FIGS. 6A and 6B which, taken together, is a simplified example illustrating aspects of the operation of the system of FIG. 1, operative in accordance with embodiments of the invention. In FIG. 6A an architectural element 600, labeled "Level 4," is associated with a development method 602 labeled "Define Data Standardization Rules" in a development method hierarchy 604, where the associated development method 602 has two descendant development methods labeled "Define Data Standardization Specifications" and "Review Data Standardization Specifications" respectively. In FIG. 6B a project plan 606 is shown in which generated tasks that are derived from the association of development method 602 with architectural element 600 are listed hierarchically in separate listings in association with architectural element "Level 4" and it's ancestor architectural elements labeled "Level 1," "Level 2," and "Level 3," and where generated tasks that are derived from the descendants of development method 602 are listed in separate listings in association with architectural element "Level 4".

Figure 7A:
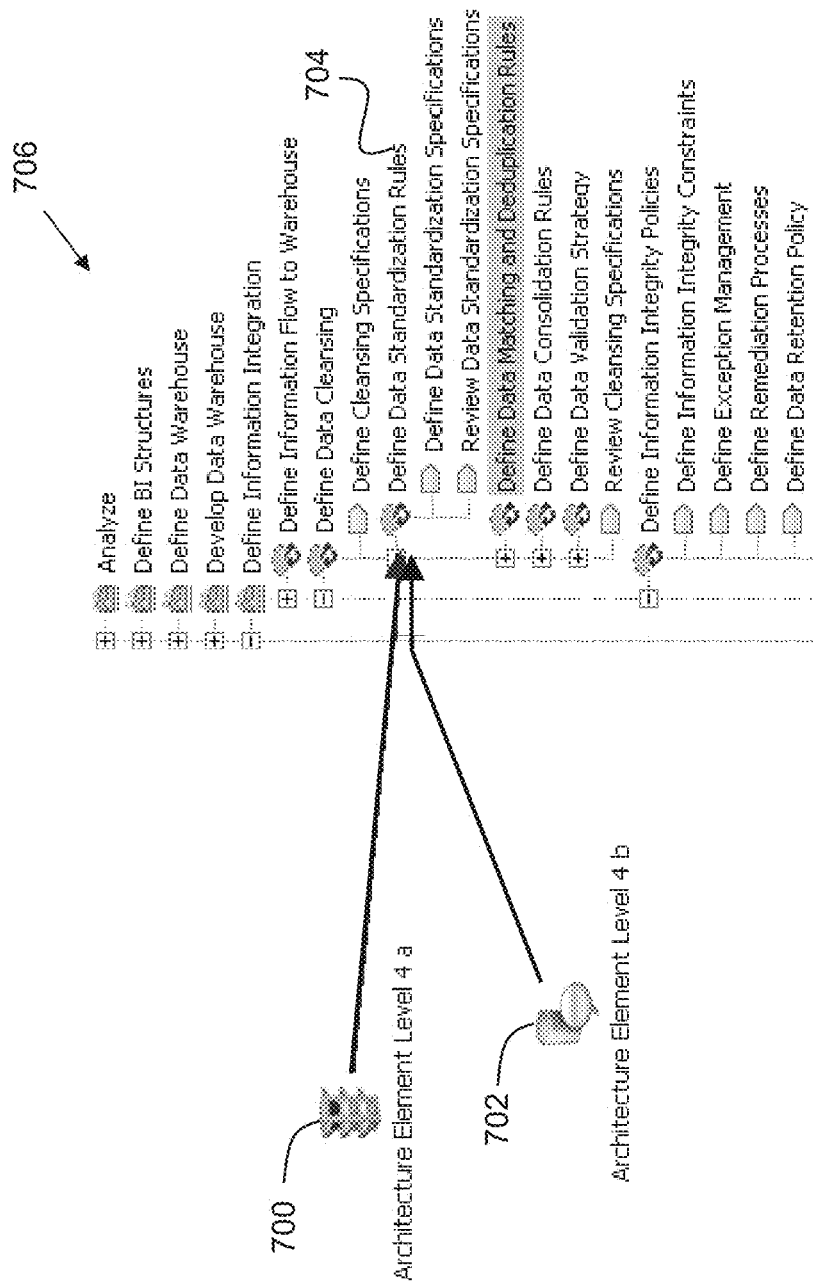
FIGS. 7A and 7B, taken together, is a simplified example illustrating aspects of the operation of the system of FIG. 1, operative in accordance with embodiments of the invention.
Figure 7B:
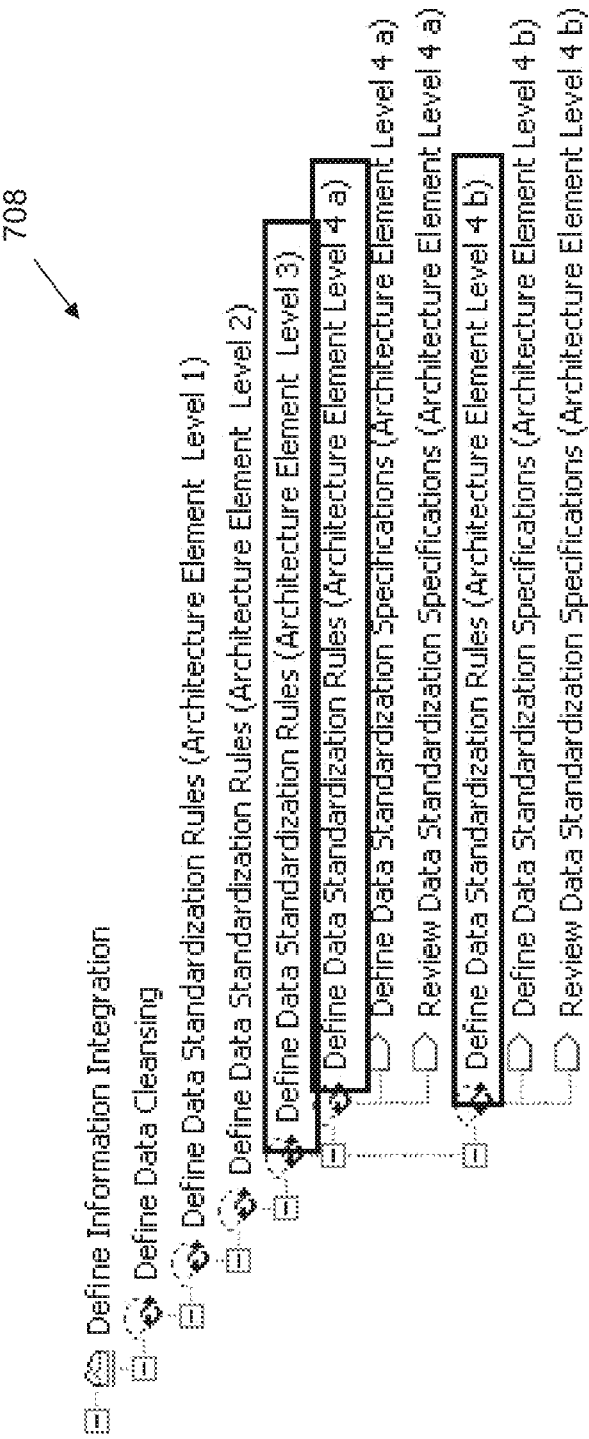

Reference is now made to FIGS. 7A and 7B which, taken together, is a simplified example illustrating aspects of the operation of the system of FIG. 1, operative in accordance with embodiments of the invention. In FIG. 7A two architectural elements 700 and 702, labeled "Level 4a" and "Level 4b" respectively, are associated with a development method 704 labeled "Define Data Standardization Rules" in a development method hierarchy 706, where the associated development method 704 has two descendant development methods labeled "Define Data Standardization Specifications" and "Review Data Standardization Specifications" respectively. In FIG. 7B a project plan 708 is shown in which generated tasks that are derived from the association of development method 704 with architectural elements 700 and 702 are listed hierarchically in separate listings in association with architectural elements "Level 4a" and "Level 4b" and their ancestor architectural elements labeled "Level 1," "Level 2," and "Level 3," and where the descendant development methods are listed in association with architectural element "Level 4a" and listed again in association with architectural element "Level 4b."

Referring now to FIG. 8, block diagram 800 illustrates an exemplary hardware implementation of a computing system in accordance with which one or more components/methodologies of the invention (e.g., components/methodologies described in the context of FIGS. 1-7B) may be implemented, according to embodiments of the invention.

As shown, the techniques for controlling access to at least one resource may be implemented in accordance with a processor 810, a memory 812, I/O devices 814, and a network interface 816, coupled via a computer bus 818 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product, the computer program product comprising:
a non-transitory computer readable storage medium having computer readable program code embodied therein, the computer readable program code, when executed by a processor of a computer, is configured to perform:
identifying a development method in a hierarchy of development methods;
identifying an architectural element in a hierarchy of architectural elements;
creating an association between the development method and the architectural element, wherein the architectural element comprises a database, and wherein the development method comprises a predefined procedure for implementing the database;

generating first tasks corresponding to the development methods in the hierarchy of development methods that are not in the association;

generating second tasks corresponding to the development method that is associated with the architectural element, wherein the second tasks are employed to implement the database;

generating a project plan with a new hierarchy to illustrate associations between the first tasks, the second tasks, and the architectural elements by:

for a task of the second tasks that is derived from the development method that has the association with the architectural element, presenting the task at multiple levels of the new hierarchy, wherein the task at each of the multiple levels is associated with the architectural element at a first level and at different levels with each ancestor of the architectural element; and for a descendent task derived from a descendant of the development method, presenting the descendant task at a descendant level as a descendant of the task in the new hierarchy with the architectural element presented at a same level of the descendant task; and providing a computer-based user interface configured to facilitate navigation between the development method and the architectural element by:

establishing interoperational linkage between the architectural element maintained in a first computer-based tool and the task maintained in a second computer-based tool;

presenting the associations between the task and the architectural element, between the task and the ancestor of the architectural element, and between the descendent task and the architectural element to display a correspondence between the development method and the architectural element; and navigating from the architectural element presented by the first computer-based tool to the task presented by the second computer-based tool.

2. The computer program product according to claim 1, wherein the computer readable program code, when executed by the processor of the computer, is configured to perform:

generating the task derived from the development method that has an association with the architectural element.

3. The computer program product according to claim 2, wherein, when generating the project plan, the computer readable program code, when executed by the processor of the computer, is configured to perform:

generating the project plan in which any of the development methods in the hierarchy of development methods that a) lacks a direct association with any of the architectural elements in the hierarchy of architectural elements and b) is an ancestor of the development method from which the task is derived, is presented within the project plan in a hierarchical association with the task.

4. A computer system, comprising:

a processor; and a storage device coupled to the processor, wherein the storage device has stored thereon a program, and wherein the processor is configured to execute the program to perform operations, wherein the operations comprise:

identifying a development method in a hierarchy of development methods;

identifying an architectural element in a hierarchy of architectural elements;

creating an association between the development method and the architectural element, wherein the architectural element comprises a database, and wherein the development method comprises a predefined procedure for implementing the database;

generating first tasks corresponding to the development methods in the hierarchy of development methods that are not in the association;

generating second tasks corresponding to the development method that is associated with the architectural element, wherein the second tasks are employed to implement the database;

generating a project plan with a new hierarchy to illustrate associations between the first tasks, the second tasks, and the architectural elements by:

for a task of the second tasks that is derived from the development method that has the association with the architectural element, presenting the task at multiple levels of the new hierarchy, wherein the task at each of the multiple levels is associated with the architectural element at a first level and at different levels with each ancestor of the architectural element; and for a descendent task derived from a descendant of the development method, presenting the descendant task at a descendant level as a descendant of the task in the new hierarchy with the architectural element presented at a same level of the descendant task; and providing a computer-based user interface configured to facilitate navigation between the development method and the architectural element by:

establishing interoperational linkage between the architectural element maintained in a first computer-based tool and the task maintained in a second computer-based tool;

presenting the associations between the task and the architectural element, between the task and the ancestor of the architectural element, and between the descendent task and the architectural element to display a correspondence between the development method and the architectural element; and navigating from the architectural element presented by the first computer-based tool to the task presented by the second computer-based tool.

5. The computer system according to claim 4, wherein the operations further comprise:

generating the task derived from the development method that has an association with the architectural element.

6. The computer system according to claim 5, wherein, when generating the project plan, the operations further comprise:

generating the project plan in which any of the development methods in the hierarchy of development methods that a) lacks a direct association with any of the architectural elements in the hierarchy of architectural elements and b) is an ancestor of the development method from which the task is derived, is presented within the project plan in a hierarchical association with the task.

* * * * *